Nov. 19, 1963   J. W. HUMPHREYS ETAL   3,111,138
CRANKCASE VENTILATION REGULATOR
Filed Jan. 26, 1961   2 Sheets-Sheet 1

INVENTORS
JOHN W. HUMPHREYS
MORRIS V. DADD
BY
ATTORNEYS

Nov. 19, 1963   J. W. HUMPHREYS ETAL   3,111,138
CRANKCASE VENTILATION REGULATOR

Filed Jan. 26, 1961   2 Sheets-Sheet 2

INVENTORS
JOHN W. HUMPHREYS
MORRIS V. DADD
BY
*Price & Heneveld*
ATTORNEYS

United States Patent Office 3,111,138
Patented Nov. 19, 1963

3,111,138
CRANKCASE VENTILATION REGULATOR
John W. Humphreys and Morris V. Dadd, Muskegon, Mich., assignors to Johnson Products, Inc., Muskegon, Mich., a corporation of Michigan
Filed Jan. 26, 1961, Ser. No. 85,042
1 Claim. (Cl. 137—480)

This invention relates to ventilation of an internal combustion engine crankcase, and more particularly to a flow control device for controlling passage of recycle vapors from the crankcase to the intake manifold of an internal combustion engine.

Effective disposal of noxious crankcase vapors caused chiefly by blow-by from engine cylinders and formerly ejected into the atmosphere has become increasingly important in the battle against smog. One potentially important method of disposal is to reroute or recycle these crankcase vapors to the intake manifold through a simple conduit provided with a flow regulator. This general system is also used for various other purposes, e.g. on engines designed for under water operation.

The flow regulator is intended to control the gaseous flow in cooperation with manifold vacuum. The regulator valves presently known, however, have several defects which make them undependable, short-lived, and very insensitive, including (1) the tendency to flutter violently at crucial flow rates; (2) rapid wear of sealing surfaces with valves having greater sensitivity even when sealing surfaces are hardened; (3) excessive carbon depositing in the tiny valve passages due to sharp angle turns adjacent passages transverse to the general flow pattern; (4) failure to prevent backflow accompanying a back-fire or the like when these transverse flow passages and sharp angle turns are eliminated; (5) necessity of mounting the valve in a particular position due to inherent structural limitations; (6) necessity of several machining operations on the members composing each valve assembly; and (7) constant redesign and retooling for the production of valves with different flow specifications.

Accordingly, it is an object of this invention to provide a unique crankcase ventilation control valve assembly that is adaptable to being formed using high speed, low cost operations such as extrusion, powdered metal pressing, and cold forming; that may be formed with little or no machining; that will operate effectively in practically any installed position; that utilizes low pressure per unit area between contacting sealing surfaces to thus alleviate wear; that is substantially free from deposit formation during operation due to the complete lack of sharp angle bends between flow passages, and yet that possesses a sealing means to prevent backflow of vapors; that may be used for long periods of time with practically no contact surface wear due to elimination of flutter and of high pressure unit area sealing contact; that can be originally designed to fit equipment of various flow requirements by merely inserting a selected inner valving member in a common valve housing; that requires no hardened sealing surfaces; and with which the valving member can be formed of any of several materials ranging from plastic to metal.

It is a further object to provide a regulator valve, the flow characteristics of which can be varied not only by slight changes in the inner valving member, but also by the assembly of the valve housing to readily adapt the regulator to a particular use.

Another object of this invention is to provide a regulator system including the vapor conduit connecting the crankcase and the intake manifold of an internal combustion engine, that has a shutoff valve means for preventing recycle vapor flow while starting the engine to thus prevent disturbance of present fuel-to-air carburation ratios.

A still further object of this invention is to provide such a shutoff valve means using the regulator valve means as a major component thereof.

Further objects and advantages of this invention will be apparent upon studying the following specification in conjunction with the drawings in which.

Basically, the invention comprises a differential pressure actuated regulator valve in a conduit connecting the crankcase of an internal combustion engine with the intake manifold. The valving assembly includes a housing having a central portion and opposite end portions forming inlet and outlet passageways, and a reciprocable valving member in the housing cooperable with the outlet passageway to variably restrict vapor flow through the valve. The vapors pass through elongated axial slots or channels in the periphery of the valving member, which slots taper radially inwardly, i.e. converge toward the outlet passageway. A portion of the valving member fits slidably and variably into the outlet passageway against a bias to effect flow restriction in response to an increased pressure differential. A second portion of the valving member is capable of forming a seal against the inlet passageway to prevent any attempted backflow.

The backflow seal may also be closed with a solenoid to prevent forward flow through the valve and recycle line during engine starting and the like. Alternatively, a separate closure valve means operated electrically, mechanically, or with fluid pressure may be provided in the conduit vapor flow system to prevent forward flow at desired times.

Figure 1:
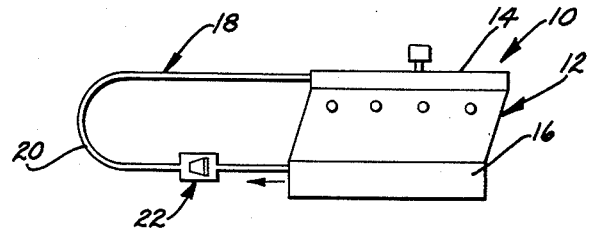
FIG. 1 is an elevational view generally depicting an internal combustion engine in combination with a vapor flow conduit system.

Referring to FIG. 1, the power plant system 10 comprises an internal combustion engine 12 including intake manifold 14 and crankcase 16, and vapor recycle conduit system 18 including tubing 20 and regulator valve assembly 22.

Figure 2:
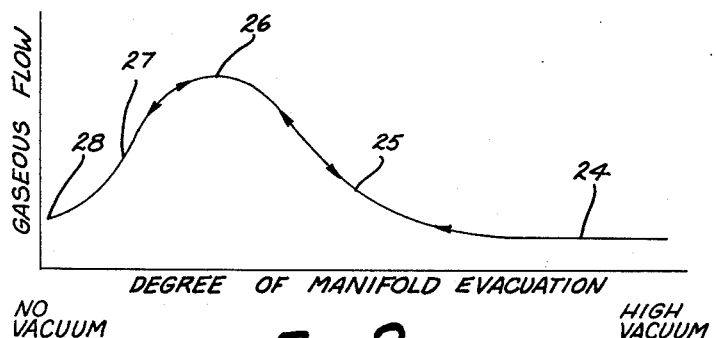
FIG. 2 is a graphic illustration showing the basic desired gaseous flow relationship with manifold vacuum in such a system.

The conduit system conducts various vapors, largely combustible, from crankcase 16 to intake manifold 14. These vapors, caused chiefly by blow-by past engine piston rings, are at a maximum under medium engine speeds and at maximum engine lead. Manifold 14 operates under varying amounts of vacuum (i.e. the difference between the absolute gaseous pressure and atmospheric pressure). Thus, as the vacuum in manifold 14 increases the amount of vapors flowing thereto increases. However, a completely direct relationship between flow rate and vacuum is not desired, but rather that relationship depicted generally in FIG. 2. The number 24 indicates the low load engine conditions, including idling and high speed, no-load operation, at which the vacuum is largest but the blow-by is smallest. The range between 25 and 27 indicates the heavy load conditions at moderate speeds. Thus during operation, the cycle normally moves back and forth between 24 and 27 with the range between 27 and 28 rarely occurring except during engine cranking periods. More specifically, if a truck engine is idling as at 24, the vacuum is at a maximum and the flow rate will be at minimum. Upon increasing engine speed and load, blow-by increases and combination of noxious fumes at a greater rate becomes necessary. Maximum blow-by occurs at point 26 with the truck approaching and rounding the top of a hill in range 26 to 27. As the truck goes down the other side, the load is decreased with the cycle reversing its path on the curve and moving over to point 24 again. At this time blow-by is considerably decreased and the amount of vapor flow through the recycle system should be substantially lessened until it decreases to a norm as indicated at 24. The purpose of regulator 22 is to effectuate this flow pattern.

Figure 3:
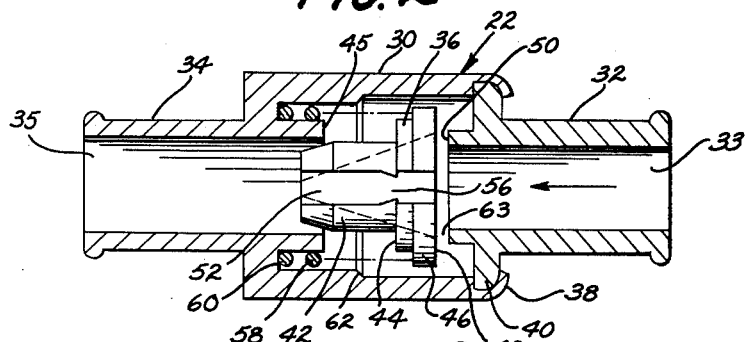
FIG. 3 is a sectional view of the regulator valve assembly used in the system of FIG. 1.

As depicted in FIG. 3, valve 22 includes a housing with a central portion 30 and end portions 32 and 34 defining inlet passageway 33 and outlet passageway 35 respectively. Within the housing is a valving member 36 reciprocally movable between the coaxial inlet and outlet passageways 33 and 35. To easily and economically enclose member 36 in the housing, end portion 32 is formed independently and joined to the central portion by deforming annular lip 38 over peripheral flange 40.

The valving member 36 requires no hardened surfaces for restricting the fluid flow or for shutting it completely off in a reverse flow action. The operation of the member is so smooth that no impacting of the surfaces occurs, unlike most prior devices. Thus the member may be formed of a relatively soft metal, a plastic material such as Teflon or nylon, or of compressed powdered metal. These materials obviously render the article susceptible to high speed forming operations. This high speed production is further facilitated by the complete lack of intricate passageway formation so characteristic of prior art devices. Member 36 includes barrel 42 adjacent outlet passageway 35 with an outer diameter slightly smaller than the inner diameter of passageway 35 to form a sliding interfit therewith. Member 36 also possesses axial surface 44 to abut the valve seat on axially inwardly projecting shoulder 45 of end portion 34. This surface retains the valving member generally within the housing. Adjacent inlet passageway 33, valving member 36 possesses a radial flange 46 of enlarged diameter to form a sealing surface 48 to abut the valve seat on inward projecting shoulder 50.

Figure 4:
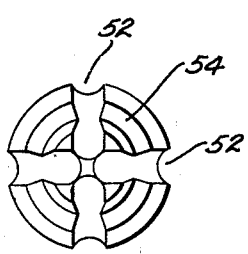
FIG. 4 is an end view of the inner valving member in the assembly of FIG. 3.

Into the periphery of valving member 36 and preferably extending coextensively therewith are formed a plurality of axial grooves or slots 52 and intermediate flutes 54 as depicted more clearly in FIG. 4. These grooves are generally tapered radially inwardly toward the outlet passageway end of member 36. The peculiar location and arrangement of these grooves provide very accurate control of flow rates. Further, they do so completely without the presence of troublesome sharp angle passageway bends. Thus, deposition on the surfaces is held to a minimum as the surfaces tend to be self-washing due to their inherent characteristics. Their location and simplicity also makes them completely adaptable to inexpensive forming operations as contrasted to intricate machining steps plaguing prior art structures. It will readily be seen that the configuration and depth of each groove, and also the number of grooves or slots may be varied to produce a valve having the desired flow characteristics. It is within the broadest concept of this invention to provide grooves which are not tapered and which do not extend the length of the valving member but rather extend varying distances from the outlet end of member 36. Thus, the flow through each groove will be stopped individually with the shorter ones being shut off first as the barrel portion is inserted. Further, barrel 42 may be varied in length and conceivably in configuration to obtain particular flow control effects. The deepest part of the grooves at flat end surface 48 of the valving member is positioned radially outwardly of the valve seat on shoulder 50 so that valving member 36 may seal the inlet passageway completely. On the barrel end of the valving member, however, a predetermined limited amount of flow can take place through neck 56 of each slot 52 in the direction indicated by the arrow even when surface 44 abuts shoulder 45.

The inner peripheral surface of central portion 30 of the housing may be varied somewhat also to give the desired flow pattern. Thus, step down portion 62 may be used to vary the flow rate sharply at particular pressure differential.

Coil spring 58 extends between annular surface 60 of housing 30 and flange 46 of member 36 to bias the valving member generally away from outlet passageway 35, but preferably not in abutment with shoulder 50 so that in its freely relaxed position, spring 58 holds valving member 36 in the position shown in FIG. 3 with clearance 63 between surface 48 and shoulder 50. In certain instances, however, it may be desirable to have spring 58 hold surface 48 against shoulder 50 in the at-rest position. The biasing force and length of spring 58 may be varied to give the desired effect. A stronger spring is preferable since it tends to prevent sticking of the valve with slight deposits.

When valve 22 is assembled and connected into recycle system 18, the vacuum in intake manifold 14 will cause vapors to pass from crankcase 16 through valving assembly 22 and tubing 20 into the intake manifold for combustion. The valve assembly may be installed in practically any position and it will still operate effectively as contrasted to the one or two position limitations of prior art devices. While the engine is idling, a large vacuum exists and the valve will be pulled against the high vacuum seat, whereby valve face surface 44 abuts the valve seat shoulder 45, thereby causing maximum restriction of flow of vapors which will be in the order of that depicted at 24 in FIG. 2. As the engine is accelerated and put under a load, the vacuum in manifold 14 will decrease and thereby tend to allow the spring 58 to urge valving member 36 to the right so that barrel 42 moves away from outlet passageway 35. This will allow more vapor flow with the vacuum decreasing from 24 to 25 to 26 and 27, with the maximum flow range from 25 to 27 being traversed. As the engine speed increases and load is reduced, for example when a truck starts downhill, the vacuum in manifold 14 again increases to thereby cause valving member 36 to be drawn further into outlet passageway 35 to thereby gradually restrict the flow of gases passing through channels 52. This restriction is now desirable because blow-by of noxious vapors has decreased. When the vacuum reaches a predetermined maximum (i.e. minimum absolute pressure) surface 44 again seats onto shoulder 45 to restrict the flow to a predetermined amount as indicated at 24 in FIG. 2.

In case of backfire in the manifold 14, face 48 of valving member 36 is forced by the reverse flow against surface 50 to thereby prevent the explosive gases from passing into crankcase 16. It should be noted that even though all sharp angle passageway bends have been eliminated, still the valve completely prevents undesirable reverse flow.

Figure 5:
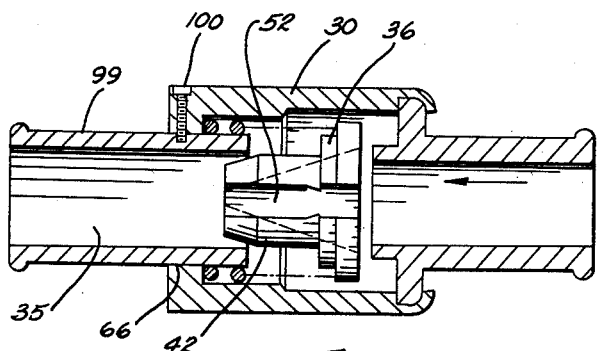
FIG. 5 is a sectional view of a modified valve assembly.

In FIG. 5 is shown a modified form of the valve depicted in FIG. 3. Here the outlet passageway forming sleeve 99 is formed independently of central portion 30 and slidably interfits with it as at 66. By so constructing the housing, the unit may be assembled to a preset accurate relationship between outlet passageway 35 which actually forms a guide way, and the guided barrel 42 of member 36. Thus, the flow curve depicted in FIG. 2 may be advanced or retarded in its entirety to control the vacuum at which the flow restriction indicated as beginning at 26 will occur. This sleeve 99 is preferably press fitted into central portion 30 during assembly. Alternatively the sleeve may be secured in a sealed relationship with set screws 100 or any other suitable method, either movable or fixed. Thus, by controlling the degree of insertion of sleeve 99, the configuration and size of channels 52, the configuration of barrel 42, the configuration of the housing inner periphery, and the length and strength of spring 58, the flow characteristics may be greatly altered to produce the desired flow pattern.

Figure 6:
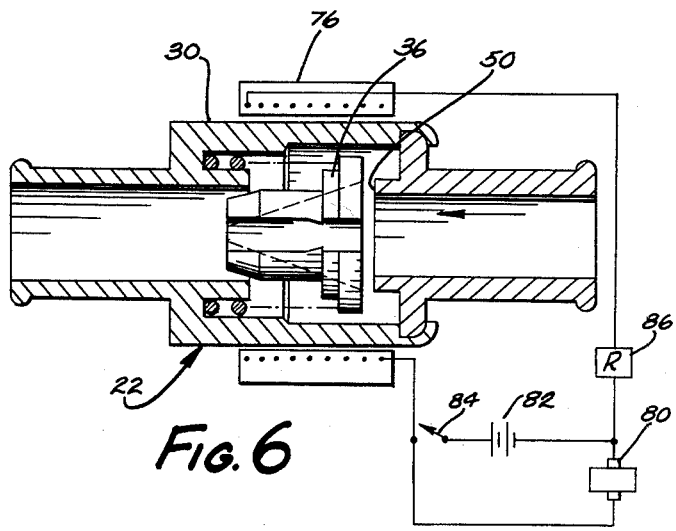
FIG. 6 is a sectional view of the valving assembly in FIG. 3 as forming the major component of a shutoff valve means.

In FIG. 6 is depicted the regulator 22 as a major component of a shutoff valve apparatus in the recycling system so that the normal preset fuel-to-air ratio of the engine will not be disturbed during starting of the engine by flow of recycled vapors into the manifold. This effectively forestalls hard starting of an engine equipped with the recycling system. This is accomplished by installing a solenoid coil 76 around the central portion 30 of the valve housing. An electrical current passed through coil 76 actuates valving member 36 to shift it to the right and form a seal against shoulder 50. At least a portion of member 36 is of a magnetizable material to be responsive to the electrical coil of the solenoid. This effectively blocks all gaseous flow through the conduit system. One method of synchronizing the shutoff operation with the starting of the engine is to place the solenoid in electrical parallel with the starter motor 80. Thus, upon closing starter switch 84 to actuate starter motor 80 solenoid coil 76 is simultaneously actuated by battery 82. Time relay 86 is inserted in the circuit to hold solenoid 76 activated for a set period after the deactuation of starter motor 80 to further facilitate easy starting. Obviously, this is only a representative circuit and may be varied in many respects as desired.

Figure 7:
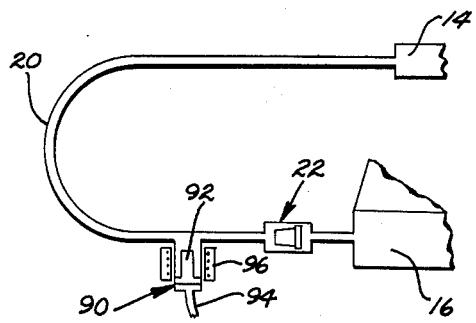
FIG. 7 is a fragmentary elevational view of a combination internal combustion engine and vapor conduit system with a regulator valve means and a separate shutoff valve means.

In FIG. 7 is depicted an alternative method of shutting off the flow of gases through the recycle tubing 20 and regulator valve 22 with an independent shutoff valve means 90. This may include any desirable valving member 92 actuated either by a pressurized fluid (hydraulic or pneumatic) through line 94, or with a solenoid 96, or by a mechanical linkage attached to member 92. If desired, the pressurized fluid and the solenoid 96 can be used simultaneously to actuate valve 92 as illustrated, but preferably they are used separately. Pressurized fluid can be obtained from a conventional air brake reservoir (not shown) or any other source of pressurized fluid. The actuating means for this valve means may constitute a special lever in the passenger compartment of the vehicle, may be connected to the shifting lever, may be electrically joined to the starter motor circuitry, or may be carried out by any other method of the many possible variations occurring to those in the art.

It will be obvious to those having ordinary skill in the art that various modifications may be made in the illustrative structure disclosed without departing from the spirit of this invention, which invention is to be limited only by the definitions found in the appended claim and the reasonable equivalents thereto.

We claim:

A vacuum operated fluid flow control valve adapted to control the passage of engine crankcase vapors from the crankcase to the engine intake manifold comprising, a valve housing including a central portion and end portions defining inlet and outlet passageways; a valving member in said central portion and reciprocally movable therein in alignment with said passageways adapted to regulate flow through said conduit from said crankcase to said intake manifold when the gaseous pressure in said manifold is below that of said crankcase; the portion of said valving member adjacent said outlet passageway capable of cooperating with said outlet passageway to restrict fluid flow therethrough; the portion of said member adjacent said inlet passageway capable of forming a seal thereagainst to stop fluid flow therethrough; said member being capable of acting as a solenoid core; and a solenoid coil around said central housing portion for causing said member to act as a solenoid core and from a seal against said inlet passageway when said coil is activated.

References Cited in the file of this patent
UNITED STATES PATENTS

| | | |
|---|---|---|
| 383,877 | Gale | June 5, 1888 |
| 1,100,761 | Mueller et al. | June 23, 1914 |
| 1,413,089 | Will | Apr. 18, 1922 |
| 1,572,842 | Blades | Feb. 9, 1926 |
| 2,154,593 | Way | Apr. 18, 1939 |
| 2,716,398 | McMullen | Aug. 20, 1955 |
| 2,853,986 | Kolbe | Sept. 30, 1958 |
| 2,882,006 | Reinecke | Apr. 14, 1959 |